United States Patent
Wu et al.

(10) Patent No.: US 12,273,243 B2
(45) Date of Patent: Apr. 8, 2025

(54) DATA-CENTRIC SERVICE-BASED NETWORK ARCHITECTURE

(71) Applicant: Intel Corporation, Santa Clara, CA (US)

(72) Inventors: Geng Wu, Portland, OR (US); Leifeng Ruan, Beijing (CN); Qian Li, Beaverton, OR (US); Dawei Ying, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/399,314

(22) Filed: Dec. 28, 2023

(65) Prior Publication Data

US 2024/0137288 A1    Apr. 25, 2024

Related U.S. Application Data

(62) Division of application No. 17/186,526, filed on Feb. 26, 2021, now Pat. No. 11,902,104.
(Continued)

(51) Int. Cl.
*H04L 41/18* (2022.01)
*G06F 18/214* (2023.01)
(Continued)

(52) U.S. Cl.
CPC ............ *H04L 41/16* (2013.01); *G06F 18/214* (2023.01); *H04L 47/762* (2013.01); *H04L 47/783* (2013.01); *H04L 47/822* (2013.01)

(58) Field of Classification Search
CPC ..... H04L 41/16; H04L 47/762; H04L 47/783; H04L 47/822; G06F 18/214; G06F 18/24
See application file for complete search history.

(56) References Cited

U.S. PATENT DOCUMENTS

2013/0028182 A1   1/2013  Geirhofer et al.
2019/0053147 A1   2/2019  Qiao et al.
(Continued)

OTHER PUBLICATIONS

U.S. Appl. No. 17/186,526, filed Feb. 26, 2021, Data-Centric Service-Based Network Architecture.
(Continued)

*Primary Examiner* — Michael Won
(74) *Attorney, Agent, or Firm* — Schwegman Lundberg & Woessner, P.A.

(57) ABSTRACT

A data-centric network and non-Real-Time (RT) RAN Intelligence Controller (RIC) architecture are described. The data-centric network architecture provides data plane functions (DPFs) that serve as a shared database for control functions, user functions and management functions for data plane resources in a network. The DPFs interact with control plane functions, user plane functions, management plane functions, compute plane functions, network exposure functions, and application functions of the NR network via a service interface. The non-RT RIC provides functions via rApps, manages the rApps, performs conflict mitigation and security functions, monitors machine learning (ML) performance, provides a ML model catalog that contains ML model information, provides interface terminations and stores ML data and Near-RT RIC related information in a database. An ML training host trains and evaluates ML models in the catalog, obtains training and testing data from the database, and retrains and updates the ML models.

12 Claims, 16 Drawing Sheets

Related U.S. Application Data

(60) Provisional application No. 62/985,728, filed on Mar. 5, 2020, provisional application No. 62/984,884, filed on Mar. 4, 2020.

(51) Int. Cl.
  *H04L 41/16* (2022.01)
  *H04L 47/70* (2022.01)
  *H04L 47/762* (2022.01)
  *H04L 47/783* (2022.01)

(56) References Cited

U.S. PATENT DOCUMENTS

| | | | |
|---|---|---|---|
| 2019/0182875 | A1 | 6/2019 | Talebi Fard et al. |
| 2020/0195495 | A1 | 6/2020 | Parker et al. |
| 2021/0051521 | A1 | 2/2021 | Misra et al. |
| 2021/0176613 | A1 | 6/2021 | Purkayastha et al. |
| 2021/0184989 | A1 | 6/2021 | Wu et al. |
| 2021/0235316 | A1 | 7/2021 | Huang et al. |
| 2021/0345104 | A1 | 11/2021 | Cheng et al. |
| 2021/0390004 | A1 | 12/2021 | Kundu et al. |
| 2022/0014963 | A1* | 1/2022 | Yeh .................. G06N 7/01 |
| 2022/0038349 | A1 | 2/2022 | Li et al. |
| 2022/0060388 | A1 | 2/2022 | Li |
| 2022/0095099 | A1 | 3/2022 | Sato et al. |
| 2022/0116908 | A1 | 4/2022 | Chun |
| 2022/0141662 | A1 | 5/2022 | Liao |
| 2022/0287038 | A1* | 9/2022 | Singh ................. H04W 12/08 |
| 2022/0408333 | A1 | 12/2022 | Ryu et al. |
| 2023/0073937 | A1 | 3/2023 | Mujumdar et al. |
| 2023/0090022 | A1 | 3/2023 | Han et al. |
| 2023/0146433 | A1 | 5/2023 | Sharma et al. |
| 2023/0308959 | A1* | 9/2023 | Shankaranarayanan ................... H04W 36/08 |
| 2024/0106709 | A1* | 3/2024 | Shete ................. H04L 45/64 |
| 2024/0259879 | A1* | 8/2024 | Ranganath .......... H04W 28/24 |
| 2024/0305533 | A1* | 9/2024 | Bai .................... H04W 24/02 |

OTHER PUBLICATIONS

"U.S. Appl. No. 17/186,526, 312 Amendment filed Nov. 7, 2023", 11 pgs.

"U.S. Appl. No. 17/186,526, Non Final Office Action mailed Jun. 16, 2023", 22 pgs.

"U.S. Appl. No. 17/186,526, Notice of Allowance mailed Oct. 3, 2023", 10 pgs.

"U.S. Appl. No. 17/186,526, PTO Response to Rule 312 Communication mailed Nov. 27, 2023", 2 pgs.

"U.S. Appl. No. 17/186,526, Response filed May 22, 2023 to Restriction Requirement mailed Mar. 20, 2023", 10 pgs.

"U.S. Appl. No. 17/186,526, Response filed Sep. 18, 2023 to Non Final Office Action mailed Jun. 16, 2023", 13 pgs.

"U.S. Appl. No. 17/186,526, Restriction Requirement mailed Mar. 20, 2023", 6 pgs.

"O-RAN Architecture Description", O-RAN.WG1.O-RAN-Architecture-Description-v03.00 Technical Specification, (2021), 32 pgs.

"O-RAN Working Group 2 (Non-RT RIC and A1 interface WG) A1 interface: Application Protocol", O-RAN.WG2.A1AP-v03.01 Technical Specification, (2021), 56 pgs.

"O-RAN Working Group 2 AI/ML workflow description and requirements", O-RAN.WG2.AIML-v01.02 Technical Report, (2021), 56 pgs.

"O-RAN.WG2.A1GAP-v02.02", O-RAN Working Group 2 (Non-RT RIC and A1 interface WG) A1 interface: General Aspects and Principles Technical Specification, (2021), 21 pgs.

* cited by examiner

DATA-CENTRIC SERVICE-BASED NETWORK ARCHITECTURE

PRIORITY CLAIM

This application is a division of U.S. patent application Ser. No. 17/186,526, filed Feb. 26, 2021, which claims the benefit of priority to U.S. Provisional Patent Application Ser. No. 62/984,884, filed, Mar. 4, 2020, and U.S. Provisional Patent Application Ser. No. 62/985,728, filed, Mar. 5, 2020, each of which is incorporated herein by reference in its entirety.

TECHNICAL FIELD

Embodiments pertain to wireless communications in 5G, or new radio (NR) systems.

BACKGROUND

The use and complexity of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)/5th generation (5G)) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
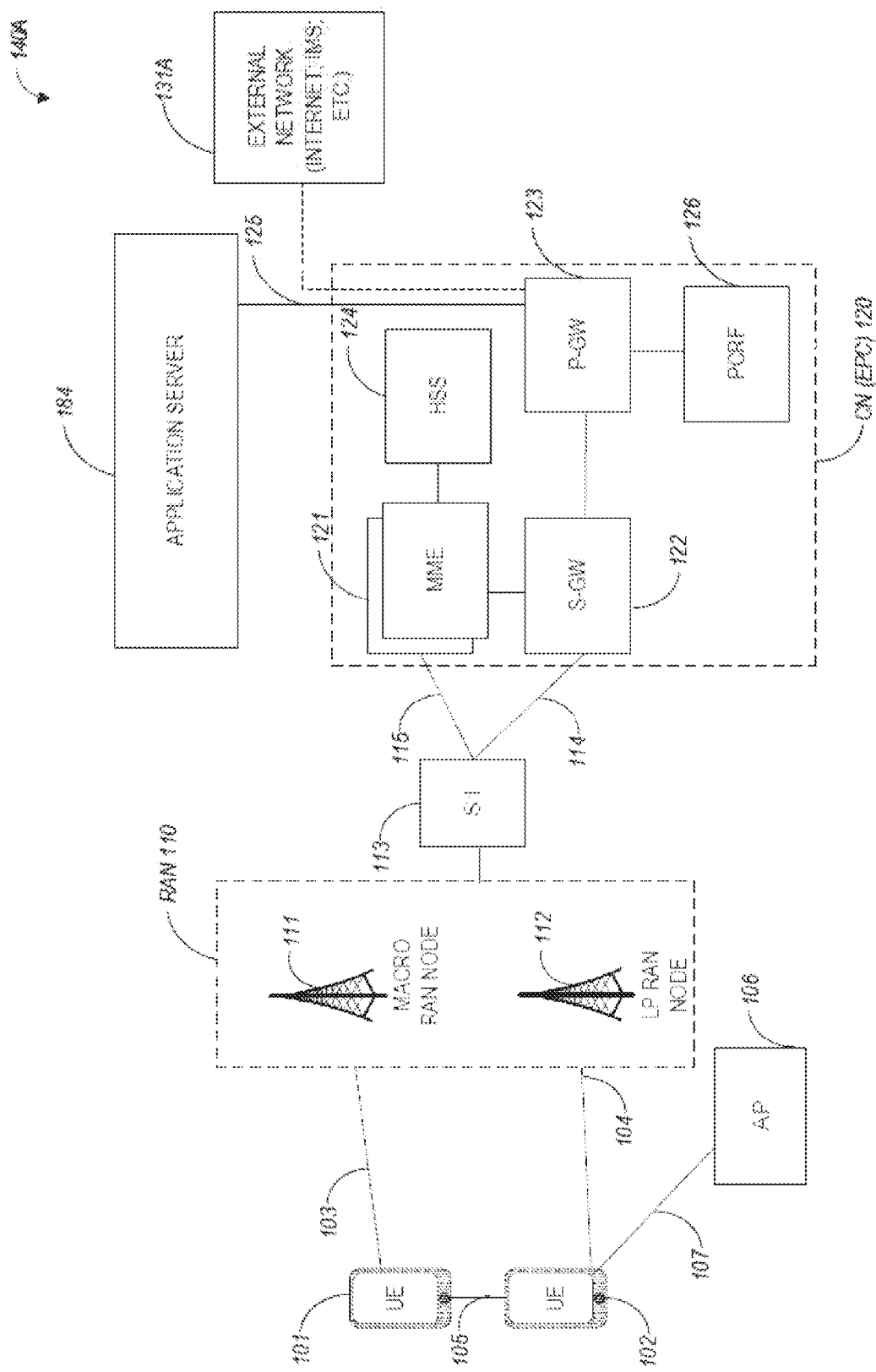
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
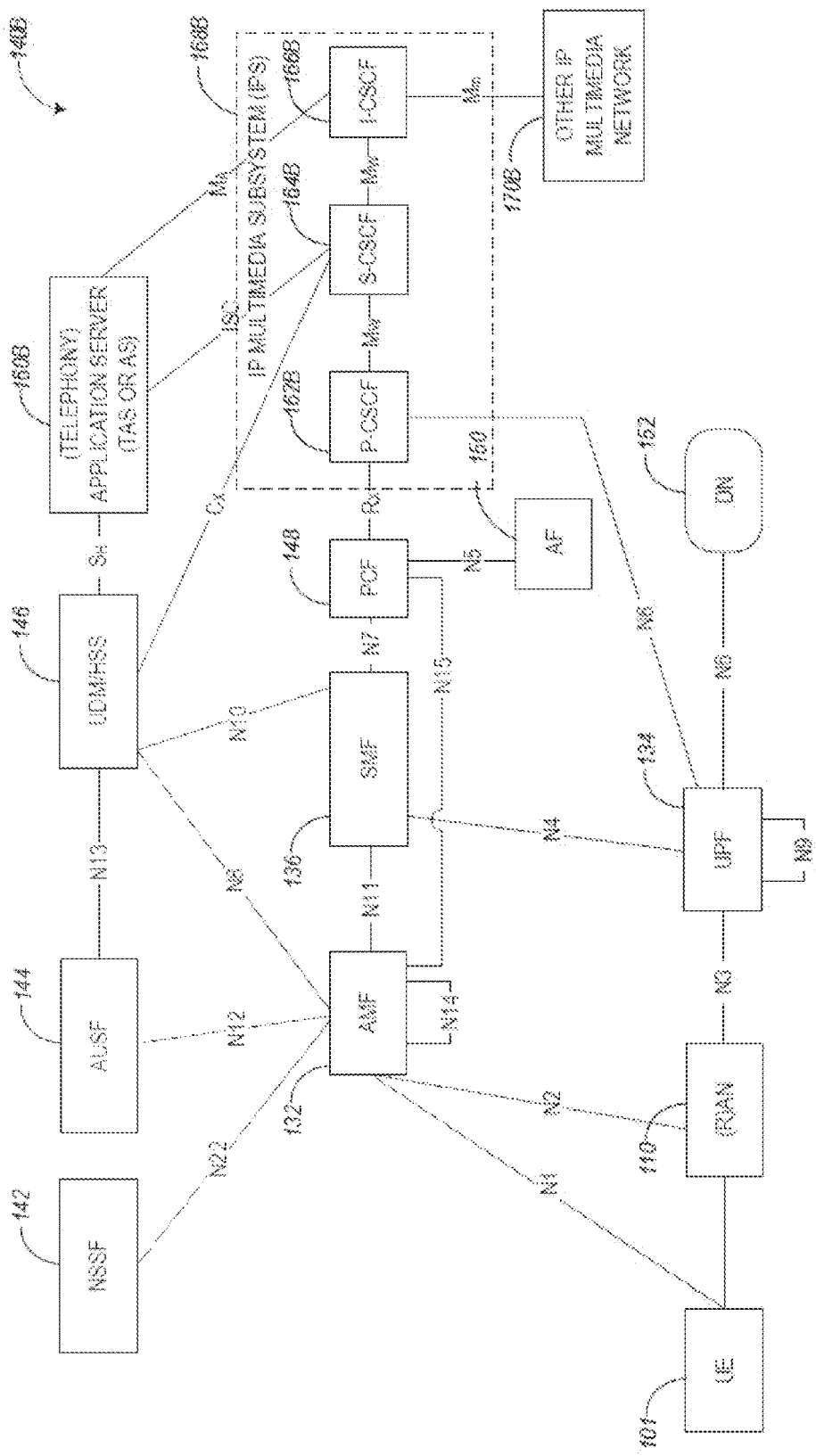
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
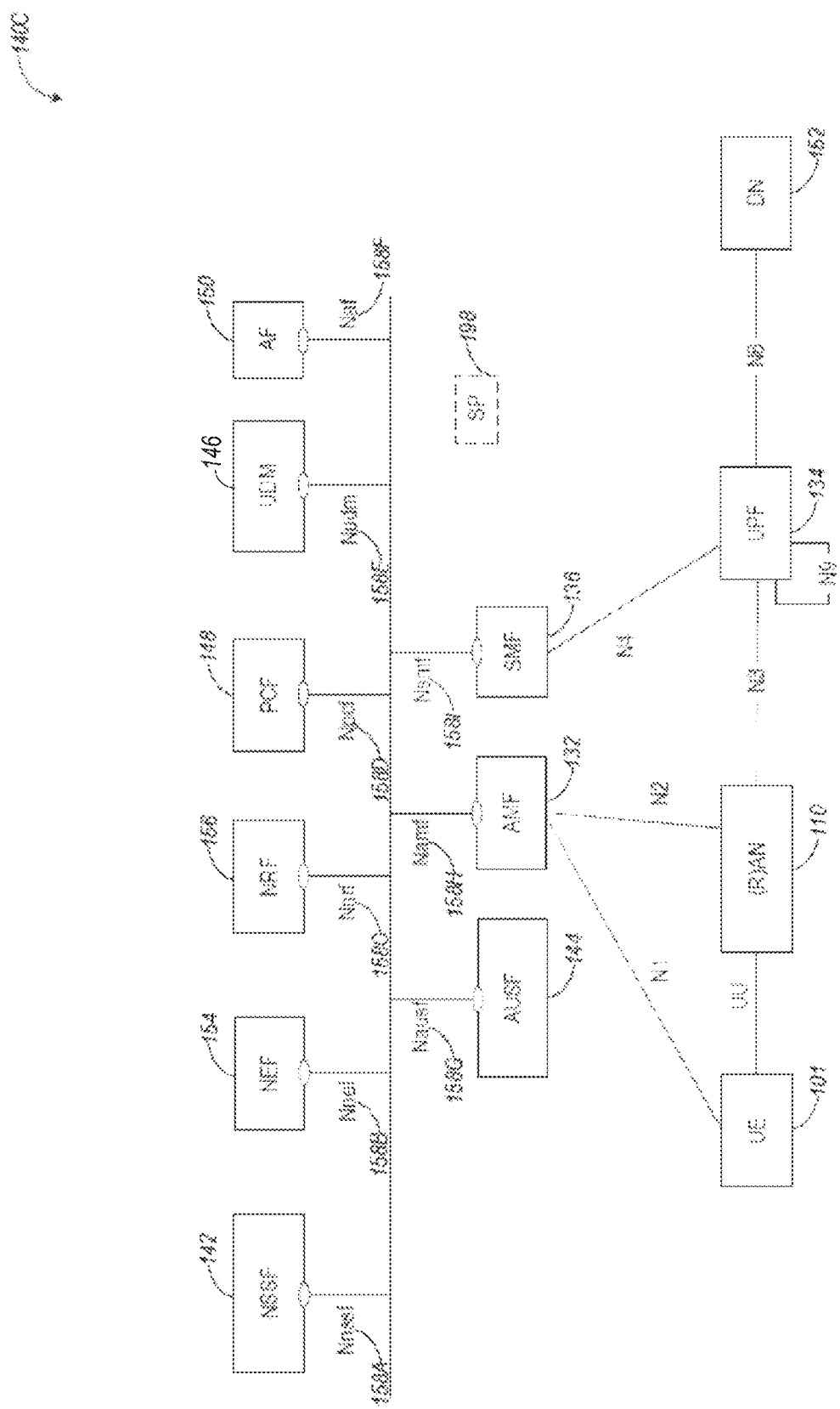
FIG. 1C illustrates a non-roaming 5G system architecture in accordance with some aspects.

FIG. 1C illustrates a 5G system architecture 140C and a service-based representation. In addition to the network entities illustrated in FIG. 1, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
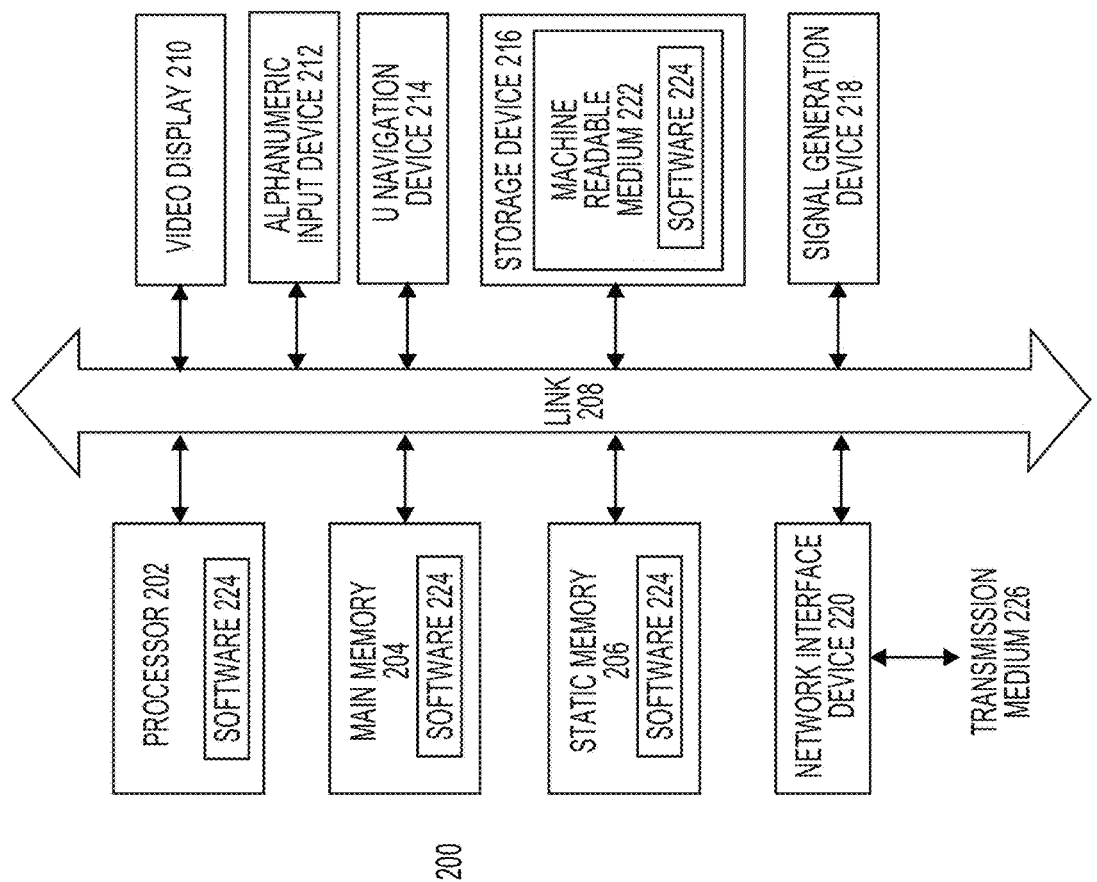
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Next generation communication systems are expected to enable computing at the very edge of network, enable artificial intelligence (AI) capabilities in the network, and make the network more intelligent, instead of purely being a data pipe. To enable those features, future networks may have elements of communication, computing, data storage, data analytics, and be able to expose network services to external users. In addition, future communications are expected to further expand to internet of things (IoT) segments beyond enhanced mobile broadband (eMBB) service, in which case the network may be flexible in deployment, able to scale down or scale up depending on use case and be able to configure functions as desired. This may involve further extending service-based architecture from the core network to the radio access network.

To this end, a data-centric service-based network architecture for the radio access network and core network (CN) are described. Functions of the network may include: control plane functions, user plane functions, management plane functions, data plane functions, compute plane functions, network exposure functions, application functions. The data plane functions may serve as a shared data base for the other functions in the network. The compute plane functions may provide computing functions (including computing required for learning and interference) that can be used by other functions in the network, devices in the network, and external parties. The control plane functions may provide radio resource control functions, computing resource control functions and data resource control functions. The user plane functions may provide functions relates with data packet transmission, such as packet generation and processing, queuing and scheduling packet reception and transmission, relaying, in-order delivery, encryption/decryption, QoS management, etc. The management plane functions may provide management functions to the other functions in the network and devices in the network. The management functions may include: parameter configuration and reconfiguration, resource management, system performance monitoring and optimization, system failure detection, prevention and recovery, etc. The network exposure function may enable services provided by functions in the network can be used by external users. The functions in the network may be connected via service-based interface.

Figure 3:
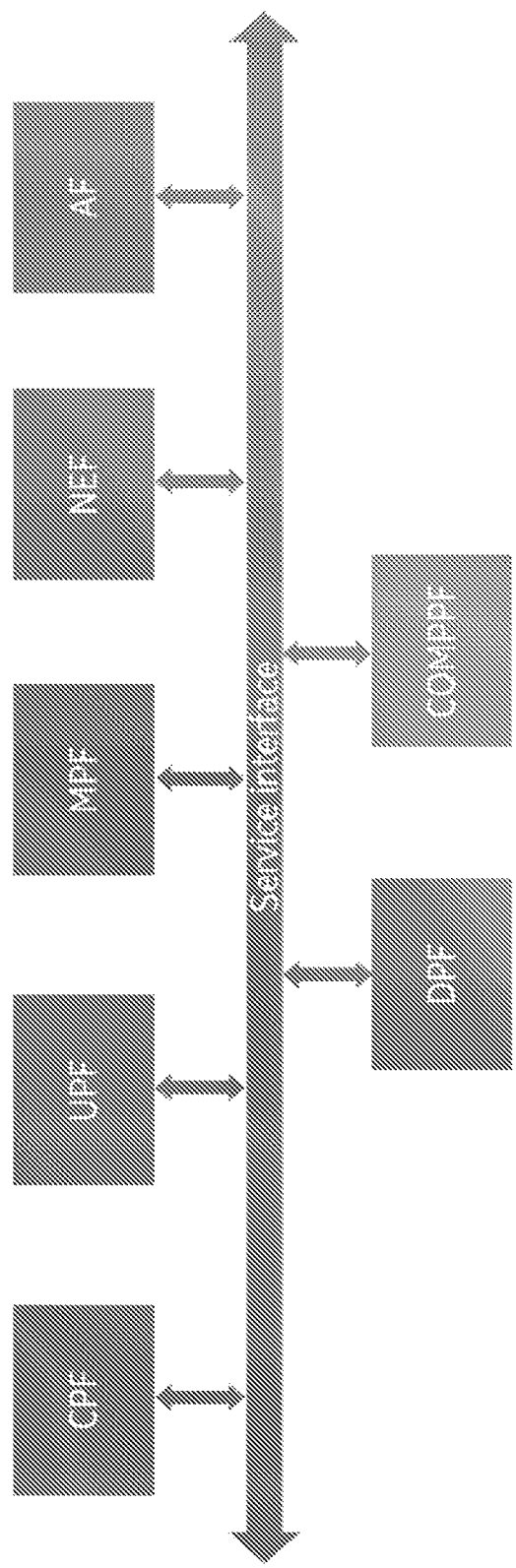
FIG. 3 illustrates a service-based architecture in accordance with some embodiments.

FIG. 3 illustrates a service-based architecture in accordance with some embodiments. FIG. 3 shows a data-centric service-based network architecture for both RAN and CN with one or more of the following: functions of the network may include: control plane functions, user plane functions, management plane functions, data plane functions, compute plane functions, network exposure functions, application functions. Further network functions can be added if desired. Data plane functions may serve as a shared data base for the other functions in the network. Within data plane, there may be control functions, user functions and management functions for data plane resources. Compute plane functions may provide computing functions (including computing required for learning and interference) that can be used by other functions in the network, devices in the network, and external parties. Within compute plane, there may be control functions, user functions and management functions for the computing plane resources. Control plane functions may provide radio resource control functions, computing resource control functions and data resource control functions. User plane functions may provide functions relates with data packet transmission, such as packet generation and processing, queuing and scheduling packet reception and transmission, relaying, in-order delivery, encryption/decryption, QoS management, etc. Management plane functions may provide management functions to the other functions in the network and devices in the network. Management functions may include: parameter configuration and reconfiguration, resource management, system performance monitoring and optimization, system failure detection, prevention and recovery, etc. Network exposure function may enable services provided by functions in the network can be used by external users. Functions in the network may be connected via service-based interface.

Figure 4:
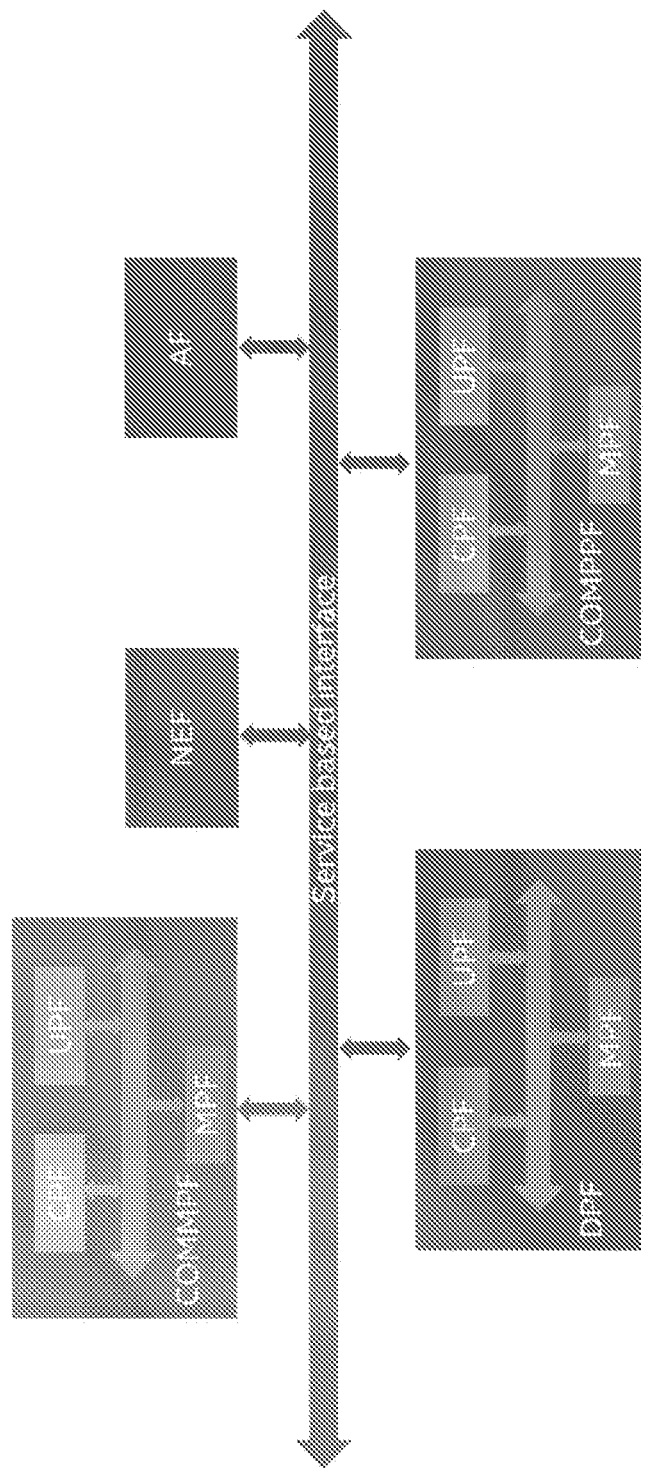
FIG. 4 illustrates another service-based architecture in accordance with some embodiments.

FIG. 4 illustrates another service-based architecture in accordance with some embodiments. The system may be composed with: Communication plane functions (COMMPF), Computation plane functions (COMPPF), Data plane functions (DPF), Network exposure functions (NEF), and Application functions (AF).

Within the COMMPF, COMPPF, DPF, further control plane functions, user plane functions and management plane functions may be present. The CPF/UPF/MPF of COMMPF, the CPF/UPF/MPF of COMPPF, the CPF/UPF/MPF of DPF, the NEF and the AF may be interconnected via the service-based interface. Some of the control plane functions of the COMPPF and DPF may be integrated into control plane functions/messages of COMMPF for performance.

Data Plane Function Details

The data plane may serve as the shared data base for other functions in the network. The data plane functions may include a unified metadata format across network services and devices. The data plane functions may include mechanisms for data sharing among communication and computation services, which include that data can be shared among multiple data analytic tasks, a device can request domain specific data from the network (e.g., channel condition map, local traffic map, info on neighboring UEs, etc.), and a device may fetch configuration data from the data plane.

The data plane functions may include mechanisms for assisting message exchange between communication and computation services, such as inter-process communication for distributed computing. The data plane functions may include maintaining data coherence and conflict resolution. The data coherence function may make sure data changed by one network function indicated to the other network functions, especially when one or more of the other network functions are operating on the same set of data. Data conflict resolution may be used to resolve conflict when two network functions attempt to make changes on the same set of data.

The data plane functions may include a mechanism for data integrity, which may include data integrity on UE uploaded data. The data plane functions may include a mechanism for data sharing across security domains. The data plane functions may include interaction with the NEF for network data exposure.

The data plane functions may include providing data management functions. The data management functions may include life cycle management, access management, data clarification and identification, and data valuation management. The data plane functions may include management of various types of data, e.g., private, public, restricted access, domain-specific data, model generated data, and measurement data, etc.

Figure 5:
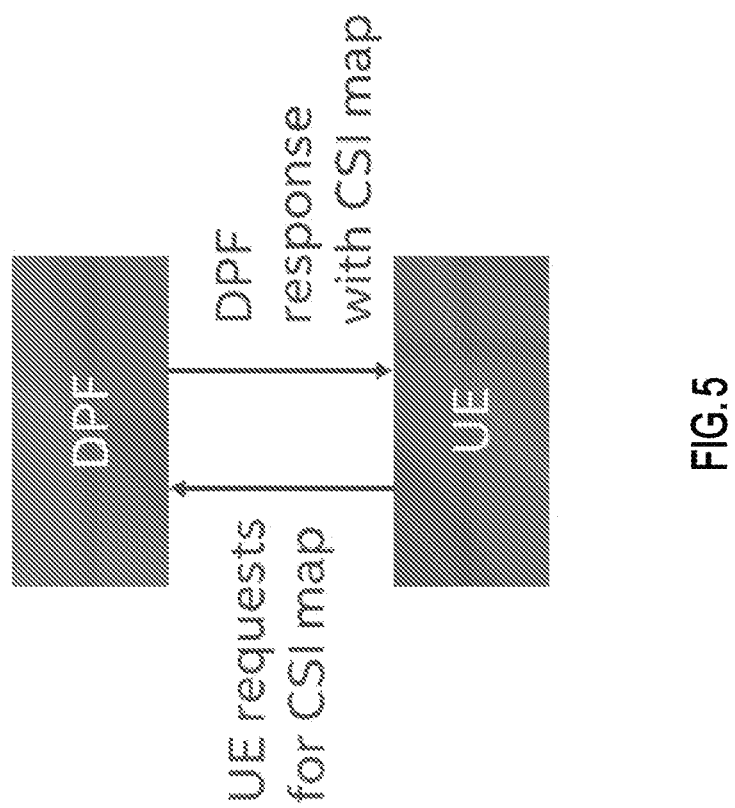
FIG. 5 illustrates a request-response-based model of data plane functions (DPFs) providing service to a UE in accordance with some embodiments.
Figure 6:
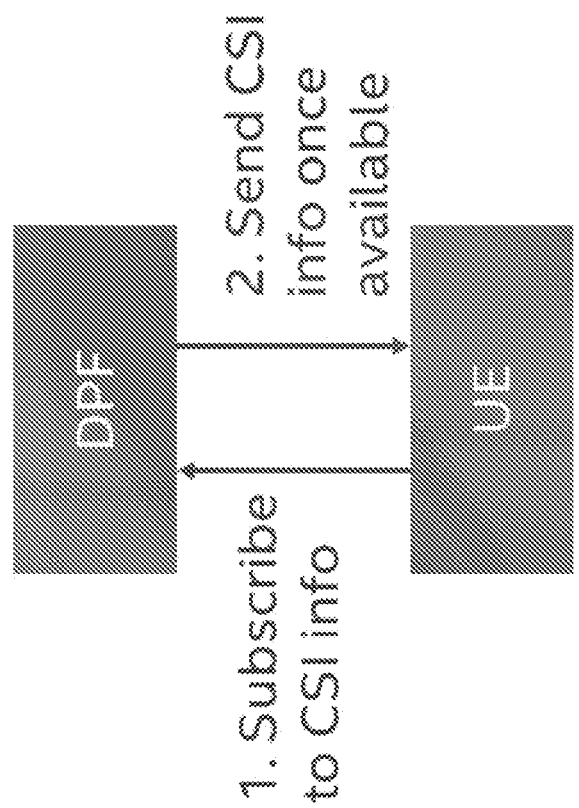
FIG. 6 illustrates a subscription-response-based model of DPF providing service to a UE in accordance with some embodiments.
Figure 7:
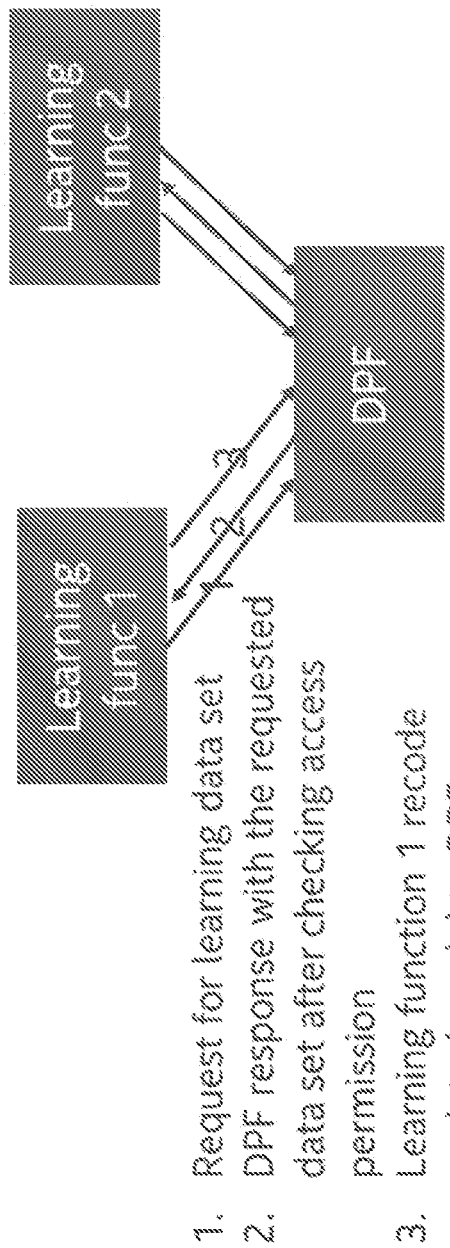
FIG. 7 illustrates a subscription-response-based model of DPF providing service to a learning function in compute plane in accordance with some embodiments.
Figure 8:
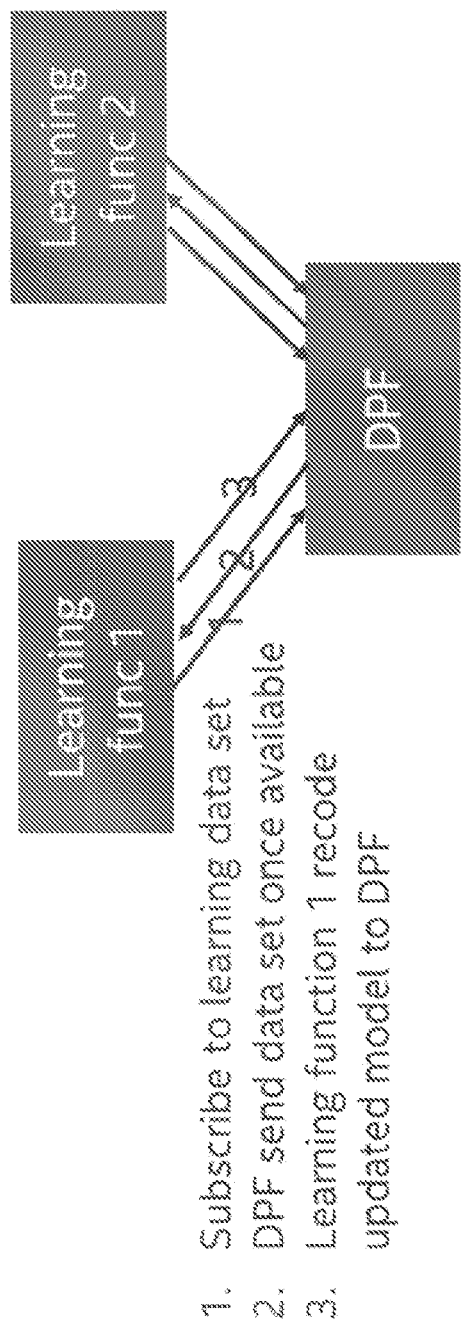
FIG. 8 illustrates a request-response-based model of DPF providing service to a learning function in compute plane in accordance with some embodiments.
Figure 9:
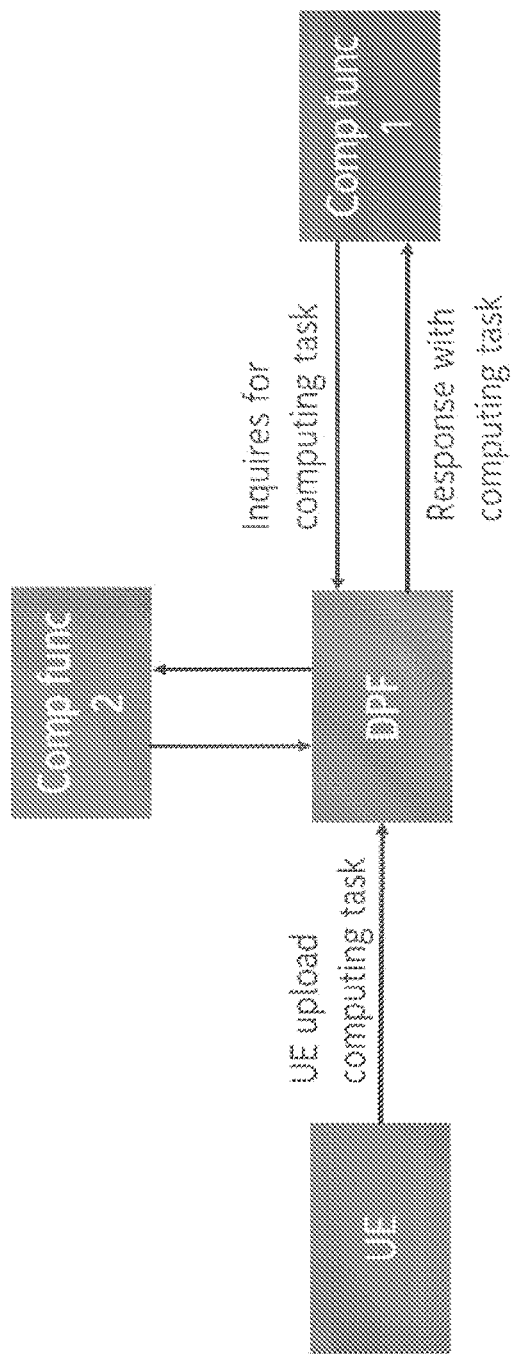
FIG. 9 illustrates a subscription-response-based model of DPF providing service to a computation offloading function in compute plane in accordance with some embodiments.
Figure 10:
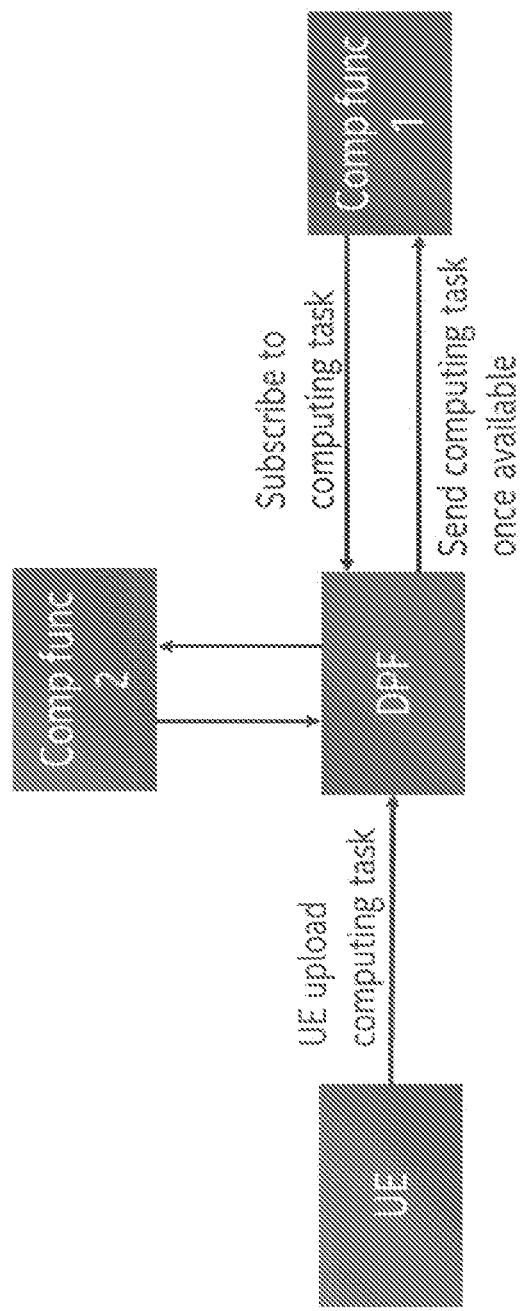
FIG. 10 illustrates a request-response-based model of DPF providing service to a computation offloading function in compute plane in accordance with some embodiments.

FIGS. 5-10 show examples of DPF services provided to UE and compute plane functions. Specifically, FIG. 5 illustrates a request-response-based model of data plane functions (DPF) providing service to a UE in accordance with some embodiments. FIG. 6 illustrates a subscription-response-based model of DPF providing service to a UE in accordance with some embodiments. FIG. 7 illustrates a subscription-response-based model of DPF providing service to a learning function in compute plane in accordance with some embodiments. FIG. 8 illustrates a request-response-based model of DPF providing service to a learning function in compute plane in accordance with some embodiments. FIG. 9 illustrates a subscription-response-based model of DPF providing service to a computation offloading function in compute plane in accordance with some embodiments. FIG. 10 illustrates a request-response-based model of DPF providing service to a computation offloading function in compute plane in accordance with some embodiments.

In the example showed in FIG. 5, the UE may request information such as a channel state information map of its surrounding area. The DPF may provide such information to the UE after having confirmed that the UE has the rights to access the requested data. If the UE does not have the authority to access the requested data, the UE request may be declined. The request-response-based message exchange between the UE and DPF can be replaced by a subscription-response based message exchange model as shown in FIG. 6, where the UE subscribes to the DPF on the CSI information data, the DPF may send the CSI information data once the data becomes available.

In the example of FIG. 7, a learning function 1 may request the learning data set from the DPF. The DPF may respond with the requested learning data set after confirming the access permission of the learning function 1. After perform learning, the learning function 1 may update the DPF with the learned model. The updated learning model from learning function 1 may be used by another learning function (learning function 2) if access rights permits. When two learning functions (func 1 and func 2) are performing learning and updating the model over the same data set or over the same model, there may be a conflict if the two learning functions are trying to modify a same data or when one learning function is updating the data while the other learning function is using the data on its own operation. The DPF may have a mechanism to resolve the collision issue and maintain data coherence. The request-response-based message exchange between learning functions and DPF may be replaced by subscription-response-based message exchange model as showed in FIG. 8, in which the learning function may subscribe with the DPF on the learning data set, the DPF may send the learning data set once the learning data set becomes available.

In the example shown in FIG. 9, a UE is offloading a computing workload to the network. The DPF may serve as the shared date plane for a message passing between computing functions in the UE and in the network and among computing functions in the network. The UE's computation offloading request may be put in queue in the DPF. A compute function that can process computing offloading request will inquire DPF on computing tasks. The DPF will respond to the inquire by pulling the computing tasks from the queue and send to compute function. The request-response-based message exchange between compute functions and the DPF can be replaced by subscription-response-based message exchange model as shown in FIG. 10, in which the compute function may subscribe to a computing task with the DPF. The DPF may send the computing workload to the computing function once the computing workload becomes available.

In some embodiments, the implementations of FIGS. 3-10 may be configured to perform one or more processes, techniques, or methods as described herein, or portions thereof. One such process may be performed by a DPF. The process may include receiving a request or subscription information from a UE or a network function (NF). The request/subscription information may be for/relate to a CSI map, learning data set, or computing task. The process may further include checking credentials of the UE/NF. For example, the DPF may determine whether the UE/NF is permitted access to the subject information. The credentials may be stored at the DPF, provided along with the request/subscription information, or available from another network entity (in which case, the DPF may send a request for the credentials or a determination of whether the UE/NF has sufficient credentials).

If it is determined that the UE/NF has sufficient privileges to access the requested information, the process may provide information to the UE/NF based on the request/subscription information. In the event that the message is a request, the providing of the information may occur upon receiving the request. In the event that the message is subscription information, the providing of the information may occur when the requested information becomes available at the DPF. To do this, the DPF may store the subscription information and periodically check the subscription information against newly acquired information to determine if it matches the content requested in the subscription information.

If it is determined that the UE/NF does not have sufficient privileges to access the requested information, the process may reject the request. This may include a message sent to the UE/NF that indicates that the UE/NF does not have sufficient privileges to access the requested information.

O-RAN is working on inserting artificial intelligence (AI) and machine learning (ML) into wireless communication networks. Both non real time (non-RT) and near real time (Near-RT) RAN intelligence controllers (RIC) were introduced in O-RAN to manage and optimize ML-assisted solutions for RAN functions, such as radio resource management. The architecture of a non-RT RIC is not yet under discussion, mainly because a non-RT RIC is regarded as a part of service management and orchestration (SMO) (in the management plane), which handles Operations, Administration and Maintenance (OAM) aspects in O-RAN. SMO may not be exposed to external sources, such as UEs.

However, a non-RT RIC may be specially designed to perform unique functions to support AI/ML applications in O-RAN. For example, a non-RT RIC is the termination of the A1 interface, hence a non-RT RIC may be responsible to generate the A1 policy (A1-P) and A1 enrichment information (A1-EI) messages, and may also be responsible to receive and interpret A1-P feedback. These functions may not be captured in a traditional OAM architecture. Thus, a non-RT RIC architecture may be used to facilitate AI/ML workflow discussion in O-RAN. Accordingly, an architecture for a non-RT RIC is proposed based on the functional requirements identified in O-RAN. The functional components in a non-RT RIC are described, as are the interactions among these components.

Figure 11:
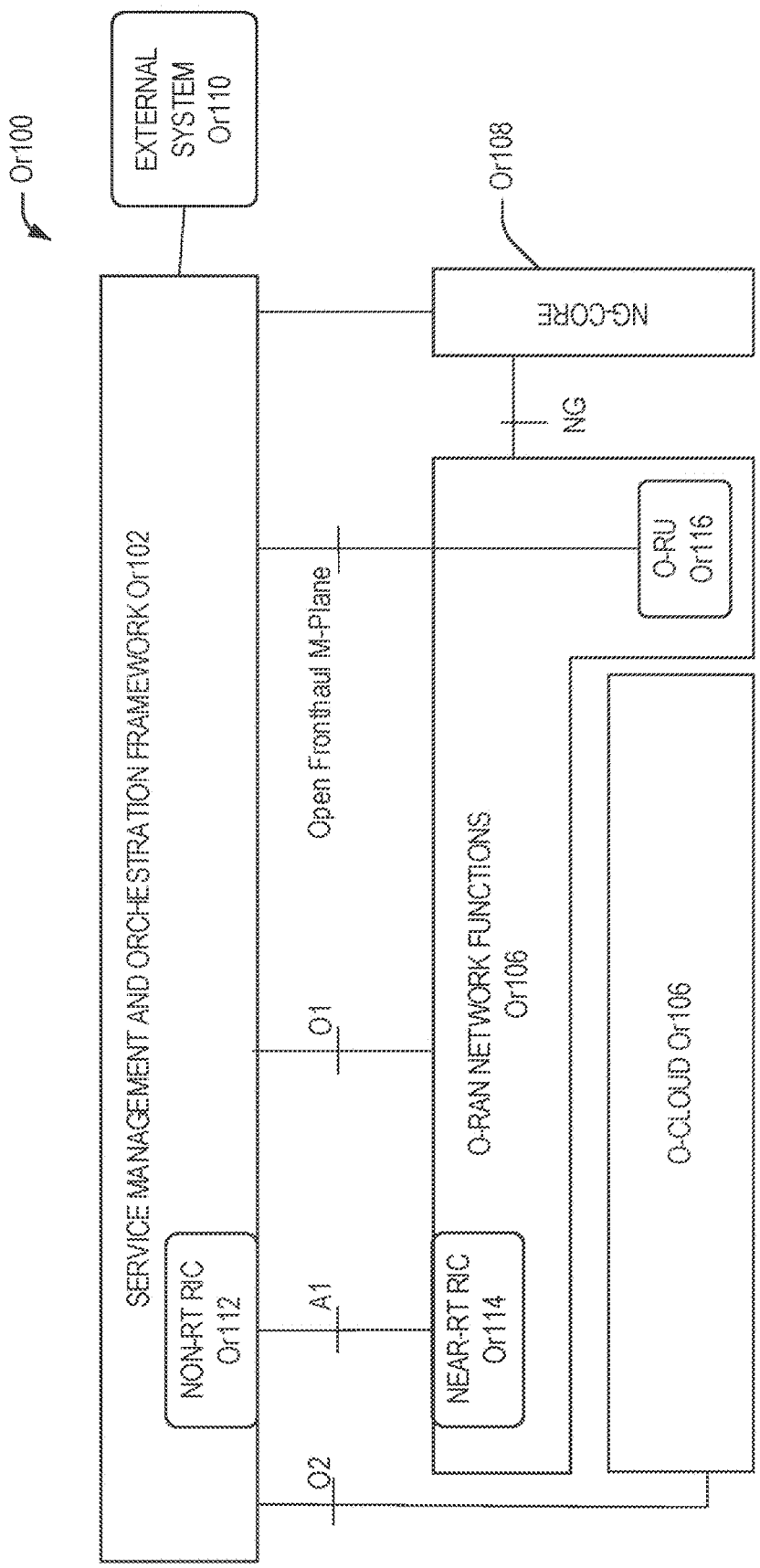
FIG. 11 illustrates a high-level view of an Open Radio Access Network (O-RAN) architecture in accordance with some embodiments.

FIG. 11 illustrates a high-level view of an Open Radio Access Network (O-RAN) architecture in accordance with some embodiments. The O-RAN architecture Or100 may include four O-RAN defined interfaces—namely, the A1 interface, the O1 interface, the O2 interface, and the Open Fronthaul Management (M)-plane interface—which may connect the Service Management and Orchestration (SMO) framework Or102 to O-RAN network functions (NFs) Or104 and the O-Cloud Or106. The SMO Or102 may also connect with an external system Or110, which provides enrichment data to the SMO Or102. FIG. 11 also illustrates that the A1 interface may terminate at an O-RAN Non-RT RIC Or112 in or at the SMO Or102 and at the O-RAN Near-RT RIC Or114 in or at the O-RAN NFs Or104. The O-RAN NFs Or104 can be virtual network functions (VNFs) such as virtual machines (VMs) or containers, sitting above the O-Cloud Or106 and/or Physical Network Functions (PNFs) utilizing customized hardware. All O-RAN NFs Or104 may be expected to support the O1 interface when interfacing the SMO framework Or102. The O-RAN NFs Or104 may connect to the NG-Core Or108 via the NG interface (which is a 3GPP defined interface). The Open Fronthaul M-plane interface between the SMO Or102 and the O-RAN Radio Unit (O-RU) Or116 may support the O-RU Or116 management in the O-RAN hybrid model. The Open Fronthaul M-plane interface may be an optional interface to the SMO Or102 that is included for backward compatibility purposes, and may be intended for management of the O-RU Or116 in hybrid mode only. The management architecture of flat mode and its relation to the O1 interface for the O-RU Or116 may be for future study. The O-RU Or116 may terminate the O1 interface towards the SMO Or102.

Figure 12:
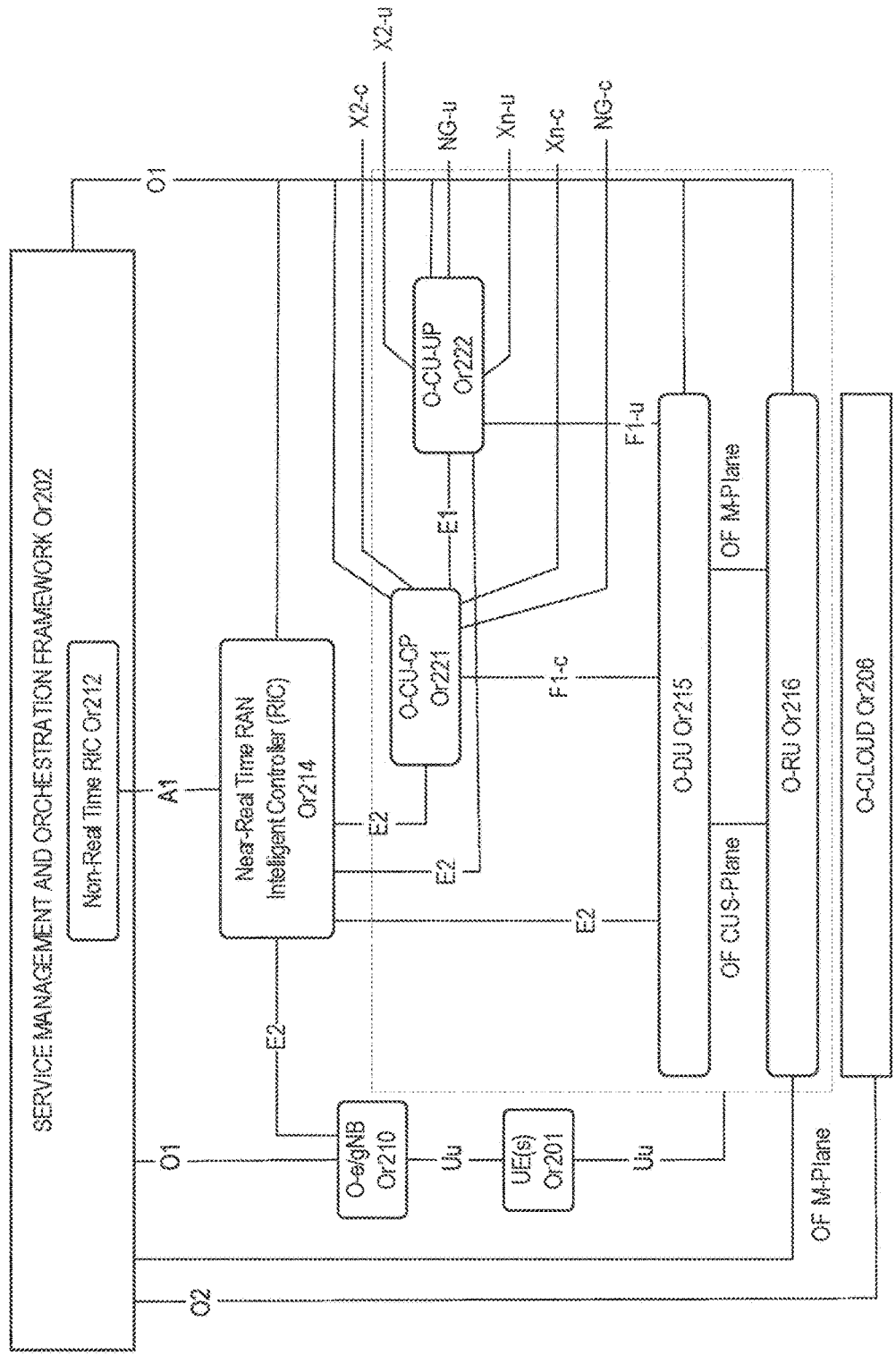
FIG. 12 illustrates an O-RAN architecture in accordance with some embodiments.

FIG. 12 illustrates an O-RAN architecture in accordance with some embodiments. In FIG. 12, the SMO Or202 may correspond to the SMO Or102, O-Cloud Or206 may correspond to the O-Cloud Or106, the non-RT RIC Or212 may correspond to the non-RT RIC Or112, the near-RT RIC Or214 may correspond to the near-RT RIC Or114, and the O-RU Or216 may correspond to the O-RU Or116 of Figure Or2, respectively. The O-RAN logical architecture Or200 may include a radio portion and a management portion.

The management portion/side of the architectures Or200 may include the SMO Framework Or202 containing the non-RT RIC Or212, and may include the O-Cloud Or206. The O-Cloud Or206 may be a cloud computing platform including a collection of physical infrastructure nodes to host the relevant O-RAN functions (e.g., the near-RT RIC Or214, O-CU-CP Or221, O-CU-UP Or222, and the O-DU Or215), supporting software components (e.g., OSs, VMMs, container runtime engines, ML engines, etc.), and appropriate management and orchestration functions.

The radio portion/side of the logical architecture Or200 may include the near-RT RIC Or214, the O-RAN Distributed Unit (O-DU) Or215, the O-RU Or216, the O-RAN Central Unit-Control Plane (O-CU-CP) Or221, and the O-RAN Central Unit-User Plane (O-CU-UP) Or222 functions. The radio portion/side of the logical architecture Or200 may also include the O-e/gNB Or210.

The O-DU Or215 may be a logical node hosting RLC, MAC, and higher PHY layer entities/elements (High-PHY layers) based on a lower layer functional split. The O-RU Or216 may be a logical node hosting lower PHY layer entities/elements (Low-PHY layer) (e.g., FFT/iFFT, PRACH extraction, etc.) and RF processing elements based on a lower layer functional split. Virtualization of O-RU Or216 is for further study. The O-CU-CP Or221 may be a logical node hosting the RRC and the control plane (CP) part of the PDCP protocol. The O O-CU-UP Or222 may be a logical node hosting the user plane part of the PDCP protocol and the SDAP protocol.

An E2 interface may terminate at a plurality of E2 nodes. The E2 nodes may be logical nodes/entities that terminate the E2 interface. For NR/5G access, the E2 nodes may include the O-CU-CP Or221, O-CU-UP Or222, O-DU Or215, or any combination of elements. For E-UTRA access the E2 nodes may include the O-e/gNB Or210. As shown in FIG. 12, the E2 interface may also connect the O-e/gNB Or210 to the Near-RT RIC Or214. The protocols over E2 interface may be based exclusively on Control Plane (CP) protocols. The E2 functions may be grouped into the following categories: (a) near-RT RIC Or214 services (REPORT, INSERT, CONTROL and POLICY); and (b) near-RT RIC Or214 support functions, which may include E2 Interface Management (E2 Setup, E2 Reset, Reporting of General Error Situations, etc.) and Near-RT RIC Service Update (e.g., capability exchange related to the list of E2 Node functions exposed over E2).

FIG. 12 illustrates an O-RAN architecture in accordance with some embodiments. In particular, FIG. 12 shows the Uu interface between a UE Or201 and O-e/gNB Or210 as well as between the UE Or201 and O-RAN components. The Uu interface may be a 3GPP defined interface, which may include a complete protocol stack from L1 to L3 and terminate in the NG-RAN or E-UTRAN. The O-e/gNB Or210 may be an LTE eNB, a 5G gNB or ng-eNB that supports the E2 interface. There may be multiple UEs Or201 and/or multiple O-e/gNB Or210, each of which may be connected to one another the via respective Uu interfaces. Although not shown in FIG. 12, the O-e/gNB Or210 may support O-DU Or215 and O-RU Or216 functions with an Open Fronthaul interface between them.

The Open Fronthaul (OF) interface(s) may be between O-DU Or215 and O-RU Or216 functions. The OF interface(s) may include the Control User Synchronization (CUS) Plane and Management (M) Plane. FIGS. 11 and 12 also show that the O-RU Or216 may terminate the OF M-Plane interface towards the O-DU Or215 and optionally towards the SMO Or202. The O-RU Or216 may terminate the OF CUS-Plane interface towards the O-DU Or215 and the SMO Or202.

The F1-c interface may connect the O-CU-CP Or221 with the O-DU Or215. As defined by 3GPP, the F1-c interface is between the gNB-CU-CP and gNB-DU nodes. However, for purposes of O-RAN, the F1-c interface may be adopted between the O-CU-CP Or221 with the O-DU Or215 functions while reusing the principles and protocol stack defined by 3GPP and the definition of interoperability profile specifications.

The F1-u interface may connect the O-CU-UP Or222 with the O-DU Or215. As defined by 3GPP, the F1-u interface is between the gNB-CU-UP and gNB-DU nodes. However, for purposes of O-RAN, the F1-u interface may be adopted between the O-CU-UP Or222 with the O-DU Or215 functions while reusing the principles and protocol stack defined by 3GPP and the definition of interoperability profile specifications.

The NG-c interface is defined by 3GPP as an interface between the gNB-CU-CP and the AMF in the 5GC. The NG-c is also referred as the N2 interface. The NG-u interface is defined by 3GPP, as an interface between the gNB-CU-UP and the UPF in the 5GC. The NG-u interface is referred as the N3 interface. In O-RAN, NG-c and NG-u protocol stacks defined by 3GPP are reused and may be adapted for O-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC. In O-RAN, X2-c and X2-u protocol stacks defined by 3GPP are reused and may be adapted for 0-RAN purposes.

The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB. In O-RAN, Xn-c and Xn-u protocol stacks defined by 3GPP are reused and may be adapted for 0-RAN purposes The EI interface is defined by 3GPP as being an interface between the gNB-CU-CP (e.g., gNB-CU-CP) and gNB-CU-UP. In O-RAN, EI protocol stacks defined by 3GPP are reused and adapted as being an interface between the O-CU-CP Or221 and the O-CU-UP Or222 functions.

The O-RAN Non-RT RIC Or212 may be a logical function within the SMO framework Or102, Or202 that enables non-real-time control and optimization of RAN elements and resources; AI/machine learning (ML) workflow(s) including model training, inferences, and updates; and policy-based guidance of applications/features in the Near-RT RIC Or214.

The O-RAN near-RT RIC Or214 may be a logical function that enables near-real-time control and optimization of RAN elements and resources via fine-grained data collection and actions over the E2 interface. The near-RT RIC Or214 may include one or more AI/IL workflows including model training, inferences, and updates.

The non-RT RIC Or212 can be an ML training host to host the training of one or more ML models. ML training can be performed offline using data collected from the RIC, O-DU Or215 and O-RU Or216. For supervised learning, non-RT RIC Or212 may be part of the SMO Or202, and the ML training host and/or ML model host/actor can be part of the non-RT RIC Or212 and/or the near-RT RIC Or214. For unsupervised learning, the ML training host and ML model host/actor can be part of the non-RT RIC Or212 and/or the near-RT RIC Or214. For reinforcement learning, the ML training host and ML model host/actor may be co-located as part of the non-RT RIC Or212 and/or the near-RT RIC Or214. In some implementations, the non-RT RIC Or212 may request or trigger ML model training in the training hosts regardless of where the model is deployed and executed. ML models may be trained and not currently deployed.

In some implementations, the non-RT RIC Or212 may provide a query-able catalog for an ML designer/developer to publish/install trained ML models (e.g., executable software components). In these implementations, the non-RT RIC Or212 may provide discovery mechanism if a particular ML model can be executed in a target ML inference host (MF), and what number and type of ML models can be executed in the ME. For example, there may be three types of ML catalogs made discoverable by the non-RT RIC Or212: a design-time catalog (e.g., residing outside the non-RT RIC Or212 and hosted by some other ML platform (s)), a training/deployment-time catalog (e.g., residing inside the non-RT RIC Or212), and a run-time catalog (e.g., residing inside the non-RT RIC Or212). The non-RT RIC Or212 may support capabilities for ML model inference in support of ML assisted solutions running in the non-RT RIC Or212 or some other ML inference host. These capabilities may enable executable software to be installed such as VMs, containers, etc. The non-RT RIC Or212 may also include and/or operate one or more ML engines, which are packaged software executable libraries that provide methods, routines, data types, etc., used to run ML models. The non-RT RIC Or212 may also implement policies to switch and activate ML model instances under different operating conditions.

The non-RT RIC Or22 may be able to access feedback data (e.g., FM and PM statistics) over the O1 interface on ML model performance and perform necessary evaluations. If the ML model fails during runtime, an alarm can be generated as feedback to the non-RT RIC Or212. How well the ML model is performing in terms of prediction accuracy or other operating statistics produced can also be sent to the non-RT RIC Or212 over O1. The non-RT RIC Or212 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC Or214 and/or in the non-RT RIC Or212, which continuously monitors resource utilization. If resources are low or fall below a certain threshold, the runtime environment in the near-RT RIC Or214 and/or the non-RT RIC Or212 may provide a scaling mechanism to add more ML instances. The scaling mechanism may include a scaling factor such as a number, percentage, and/or other like data used to scale up/down the number of ML instances. ML model instances running in the target ML inference hosts may be automatically scaled by observing resource utilization in the MF. For example, the Kubernetes® (K8s) runtime environment typically provides an auto-scaling feature.

The A1 interface is between the non-RT RIC Or212 (within or outside the SMO Or202) and the near-RT RIC Or214. The A1 interface may support three types of services, including a Policy Management Service, an Enrichment Information Service, and ML Model Management Service. A1 policies may have the following characteristics compared to persistent configuration: A1 policies may not be crucial to traffic; A1 policies may have temporary validity; A1 policies may handle individual UE or dynamically defined groups of UEs; A1 policies may act within and take precedence over the configuration; and A1 policies may be non-persistent, i.e., do not survive a restart of the near-RT RIC.

The term "application" may refer to a complete and deployable package, environment to achieve a certain function in an operational environment. The term "AI/ML application" or the like may be an application that contains some AI/ML models and application-level descriptions.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

Thus, as shown in FIG. 12, a non-RT RIC may be functionality internal to SMO, and may provide A1 interface to the Near-RT RIC. One goal of a non-RT RIC is to provide policy-based guidance and enrichment information to Near-RT RIC. A non-RT RIC may be also responsible for ML model management in O-RAN. Moreover, a non-RT RIC can leverage SMO services to optimize RAN actions, based on its data analytics and AI/ML algorithms. The functional requirements for non-RT RIC, identified during AI/ML workflow discussion in O-RAN are provided below.

Figure 13:
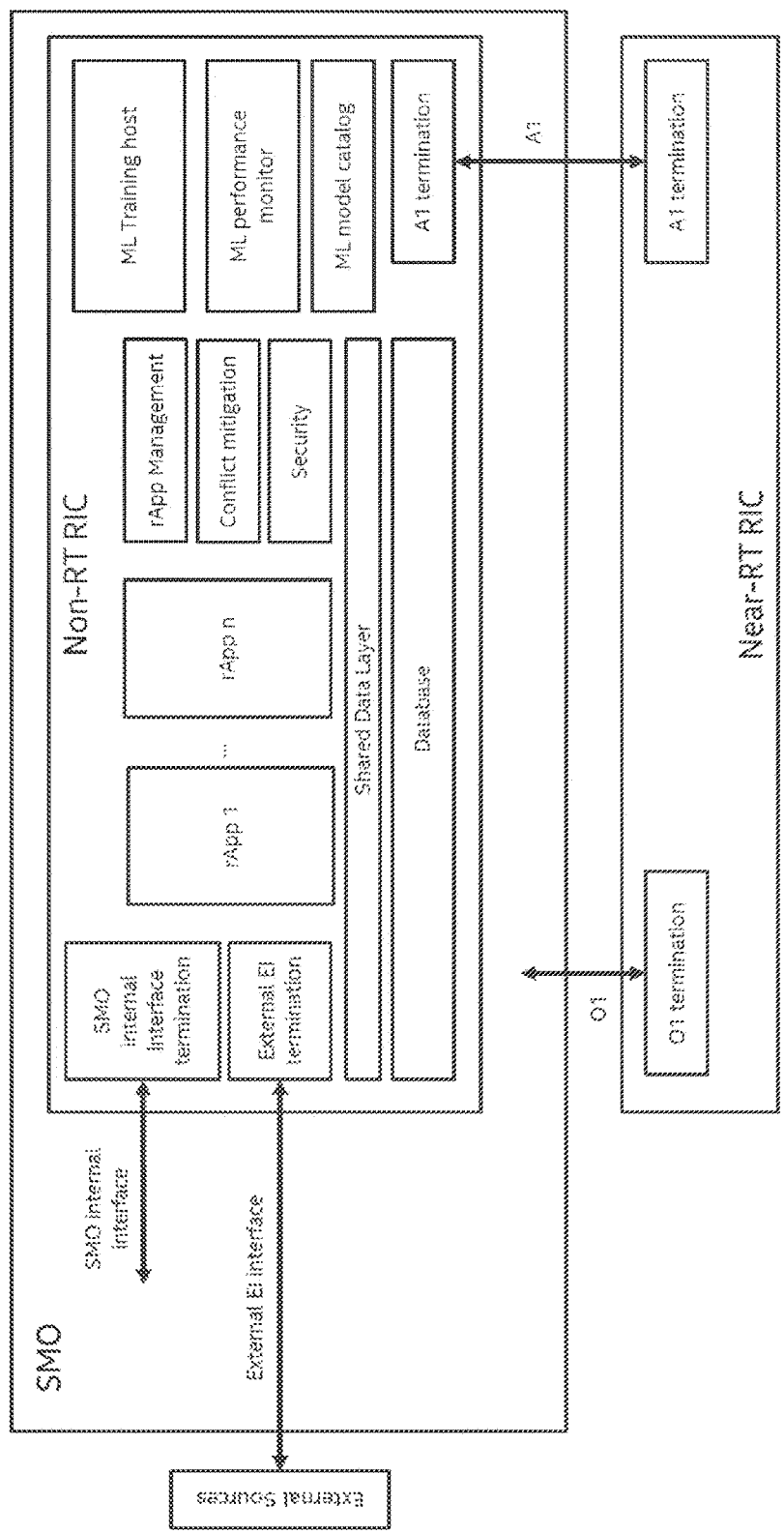
FIG. 13 illustrates a non-real time (RT) RAN intelligent controller (RIC) in accordance with some embodiments.

FIG. 13 illustrates a non-RT RIC in accordance with some embodiments. In FIG. 13, within a non-RT RIC, there may be rApps, rApp management service, security functions, conflict mitigation, database, ML training host, ML performance monitor, ML model catalog, termination for SMO internal interface, termination for external enrichment information (EI), and termination for A1 interface.

rApps: rApps may be the hosts of AI/ML applications in a non-RT RIC. They may act as ML inference host for a non-RT ML solution, which refers as deployment scenario 1.1 in O-RAN AI/ML workflow. An AI/ML application can use one or more trained ML models, which are deployed by the SMO. rApps may get inference data from a database via Shared Data Layer (SDL) APIs. rApps can also store ML output data in database via SDL APIs. This output data can be used as input data for other rApps. rApps may generate A1-P and A1-EI messages to provide policy-based guidance and enrichment information to a Near-RT RIC. rApps may generate configuration management (CM) messages to SMO via SMO internal interface. rApps may interpret A1 policy feedback message from a Near-RT RIC.

rApp management: rApp management services may provide both lifecycle management (LCM) of rApps and fault, configuration, accounting, performance, and security (FCAPS) management of rApps.

Conflict mitigation: conflict mitigation may be responsible to address conflicting CM messages generated from different rApps.

Security: security functions may apply to interface terminations in non-RT RIC. Security may prevent an unauthorized ML designer from publishing/installing ML models into ML model catalog via SMO internal interface. Security may also prevent an unauthorized ML designer from making an inquiry about the ML capability of an ML inference host (rApps or xApps). Security may check the credentials of external EI sources, and prevent a malicious external source from writing unauthorized data into database. Security may prevent exposure of data in the database to an unauthorized Near-RT RIC via A1 interface Database: the database may store ML training data, ML testing data, ML inference date, ML performance data, and rApps' output information. Near-RT RIC related information may also be stored for ML model management in Near-RT RIC, which may be connected to non-RT RIC via A1 interface.

ML training host: the ML training host may be responsible for ML model training and testing in non-RT RIC. The ML training host may have access to training/testing data in the database via SDL APIs. The ML training host may train ML models, which may be published/installed by the ML designer in the ML model catalog, using the ML training data. The ML training host may test a ML model using the ML testing data. The ML training host may send out a notification to a SMO that a ML model is trained. The ML training host may accept re-training and ML update requests from the ML performance monitor, and re-train or update the model accordingly.

ML performance monitor: the non-RT RIC may conduct performance monitoring on ML models. The ML performance monitor may get ML performance data from the database via SDL APIs. The ML performance monitor may evaluate the ML model performance based on the collected data. The ML performance monitor may trigger re-training and ML model update to the ML training host. The ML performance monitor may flag out malfunctioning ML models based on their performance. The ML performance monitor may notify the SMO about malfunctioning models via the SMO internal interface.

ML model catalog: the catalog may allow a ML designer to publish/install ML models. The ML model catalog may also provide a discovery mechanism so that the ML designer can query about whether a specific ML mode can be executed in a ML inference host (rApps or xApps), or what type or number of ML models can be executed in a ML inference host (rApps or xApps).

SMO internal interface termination: the SMO may relay collected data from the Near-RT RIC, O-RAN central units (O-CU), O-RAN distributed units (O-DU), O-RAN radio units (O-RU), and UEs, to the non-RT RIC via the SMO internal interface, for ML training, testing, inference, and performance monitoring. The SMO internal interface termination may receive ML training data from the SMO and route the data to the ML training database. The SMO internal interface termination may receive ML testing data from the SMO and route the data to the ML testing/evaluation database. The SMO internal interface termination may receive ML inference data from SMO and route the data to the ML inference database. The SMO internal interface termination may receive ML performance data from the SMO and route the data to the ML performance database. The SMO internal interface termination may receive ML model deployment from SMO and route the trained ML model to the responding rApps. The SMO internal interface termination may forward a trained ML model to the SMO. The SMO internal interface termination may forward a CM message (generated by rApps) to the SMO. The SMO internal interface termination may forward a ML model malfunctioning notice from a ML performance monitor to the SMO.

A1 interface termination: the A1 interface termination may send A1-P and A1-EI to the Near-RT RIC. The A1 interface termination may also receive A1 policy feedback from the Near-RT RIC.

External EI interface termination: The external EI interface termination may receive external EI from external sources. The external EI interface termination may also forward EI requests (from xApps) to the external sources.

Figure 14:
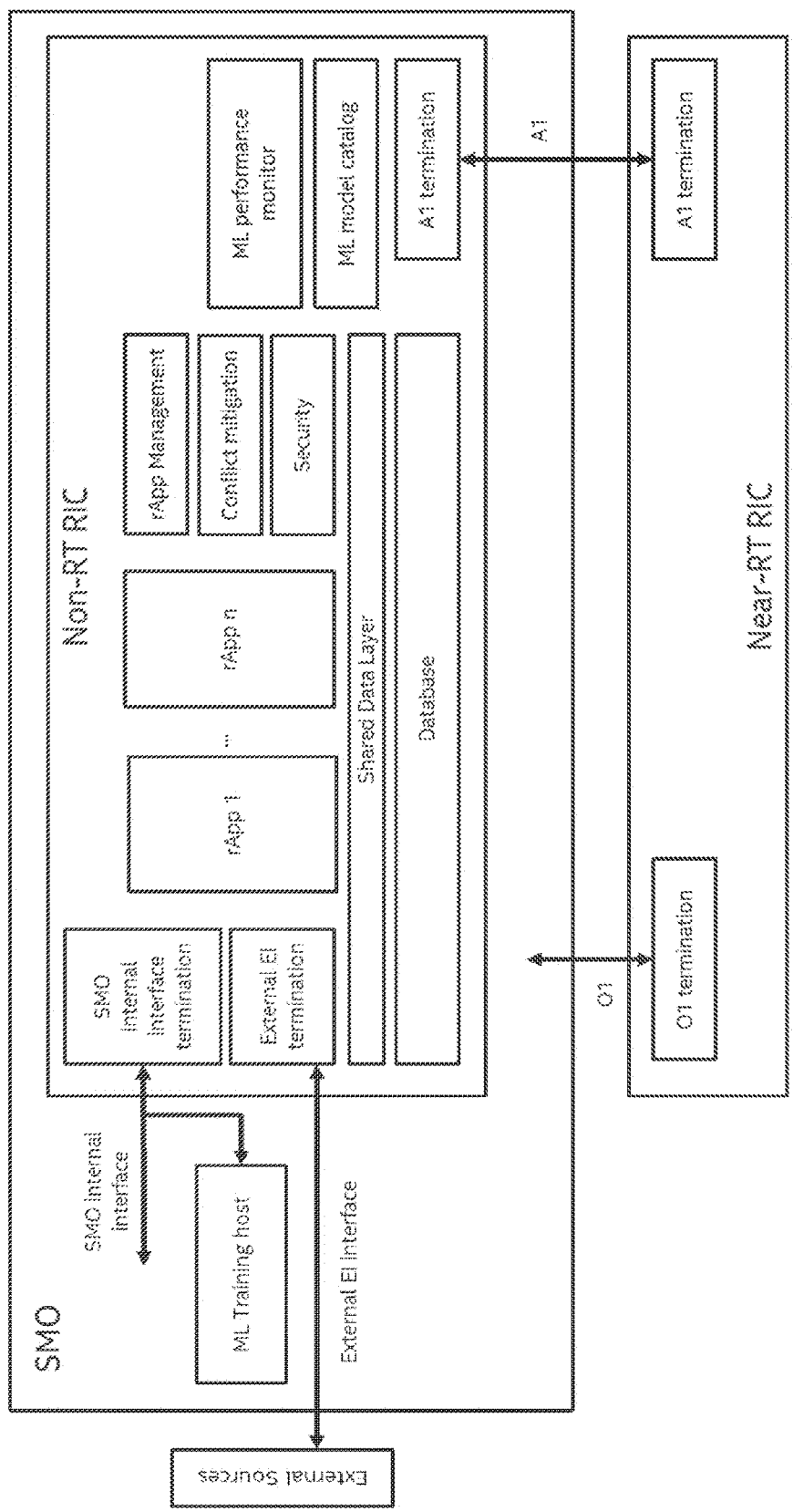
FIG. 14 illustrates architecture of a non-RT RIC in accordance with some embodiments.

FIG. 14 illustrates architecture of a non-RT RIC in accordance with some embodiments. One difference between the architecture of FIGS. 13 and 14 is the placement of the ML training host. In FIG. 14, the ML training host is outside of the non-RT RIC and may reside within the SMO.

In this implementation, the ML training host may access the SMO's dataset for ML model training and testing. The ML training host may access the ML model catalog via the SMO internal interface. Moreover, the SMO internal interface termination may send a re-training, model update request from the ML performance monitor to the ML training host.

[REQ-Non-RT RIC-FUN1]: the Non-RT RIC may request/trigger ML model training in training hosts.

[REQ-Non-RT RIC-FUN2]: the Non-RT RIC may provide a query-able catalog for the ML designer to publish/install trained ML models (executable software components) and the Non-RT RIC may provide a discovery mechanism if a particular ML model can be executed in the target ML inference host (MF), and what number (and type) of ML models can be executed in the MF.

[REQ-Non-RT RIC-FUN3]: the Non-RT RIC may support necessary capabilities (enable executable software to be installed, e.g., containers) for ML model inference in support of ML assisted solutions running in non-RT RIC.

[REQ-Non-RT RIC-FUN4]: the Non-RT RIC may be able to access feedback data over the O1 interface on ML model performance and perform evaluation.

[REQ-Non-RT RIC-FUN5]: As part of the ML Application "registration", the ML Inference Host may be able to digest information relating the data type(s) and periodicity thereof that the ML Application produces and consumes. This may apply both to the Non-RT RIC function and the Near-RT RIC as the ML Inference Host.

[REQ-Non-RT RIC-FUN6]: the ML Applications may be able to perform "registration" interactions with the ML Inference Host communicating information relating the data type(s) and periodicity thereof that the ML Application produces and consumes. This may apply both to those ML Applications that consider the Non-RT RIC function as the ML Inference Host, as well as those ML Applications that consider the Near-RT RIC as the ML Inference Host.

[REQ-Non-RT RIC-FUN7]: The ML Inference Host may be able to match data consumption needs with data sources. In this respect a data source could be either an ML Application (i.e., another ML Application's data "produced") or the ML Inference Host itself (e.g., mediating an O1-VES data source via the SMO). The ML Inference Host may consider it a registration-time validation error if no corresponding source can be matched to an ML application's "consumed data" requirements. This may apply both to the Non-RT RIC function and the Near-RT RIC as the ML Inference Host.

[REQ-Non-RT RIC-FUN8]: The ML Inference Host may be able to process scoped data "subscription" requests from ML Applications, working with other neighboring (i.e., SMO, Non-RT RIC function, Near-RT RIC Platform) functions as desired to set up the corresponding data routing (e.g., routing of O1-VES data to the ML Application, routing of one ML Application's produced data to the consuming ML Application). This may apply both to the Non-RT RIC function and the Near-RT RIC as the ML Inference Host.

[REQ-Non-RT RIC-FUN9]: For subscription requests that correspond to data produced by another ML Application, the ML Inference Host function may pass the information content thereof (e.g., data type, scope, periodicity) to that other ML Application for processing. This may apply both to the Non-RT RIC function and the Near-RT RIC as the ML Inference Host.

[REQ-Non-RT RIC-FUN10]: ML Applications that produce data may be able to interact with the ML Inference Host to receive and process scoped subscription requests. The ML Application may be responsible for determining and generating to the ML Inference Host any additional subscription requests to produce the requested data. This may apply both to those ML Applications that consider the Non-RT RIC function as the ML Inference Host, as well as those ML Applications that consider the Near-RT RIC as the ML Inference Host.

[REQ-Non-RT RIC-FUN11]: The ML Inference Host may be able to provide data mediation functionality such that, if two separate ML Applications request the same ML Application-produced data, the ML Inference Host may split the data feed without placing a burden on the source ML Application. This may apply both to the Non-RT RIC function and the Near-RT RIC as the ML Inference Host.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus configured to provide a non-real time (RT) Radio Access Network (RAN) intelligent controller (RIC) in Open Radio Access Network (O-RAN), the apparatus comprising:
   processing circuitry configured to:
      use a plurality of rApps configured to provide a plurality of functions;
      manage the plurality of rApps, management of the plurality of rApps comprising lifecycle management (LCM) and fault, configuration, accounting, performance, and security (FCAPS) of the plurality of rApps;
      perform conflict mitigation and security functions, the conflict mitigation to address conflicting messages generated from different rApps;
      monitor machine learning (ML) performance via a ML performance monitor;
      provide a ML model catalog that indicates whether a specific ML mode and what type or number of ML models can be executed in a ML inference host; and
      provide a plurality of interface terminations; and
   a memory configured to store ML data and Near-RT RIC related information in a database.

2. The apparatus of claim 1, wherein the processing circuitry is further configured to use the plurality of rApps to:
   perform ML inference generate artificial intelligence (AI) and ML-based solutions,
   generate A1-P and A1-EI messages to a Near-RT RIC, generate configuration management (CM) messages to a service management and orchestration (SMO), and interpret an A1 policy feedback message from the Near-RT RIC.

3. The apparatus of claim 1, wherein the processing circuitry is further configured to perform security functions that are configured to:

prevent an unauthorized ML designer from publishing and installing ML models into an ML model catalog, prevent the unauthorized ML designer from inquiring about an ML capability of an ML inference host, check credentials of external EI sources, prevent malicious external sources from writing unauthorized data into the database, and prevent exposure of data in the database to an unauthorized Near-RT RIC via an A1 interface.

4. The apparatus of claim 1, wherein:

monitor the ML performance by:

monitoring ML model performance and obtaining ML performance data from the database, sending re-training, ML model update requests to a ML training host, flagging malfunctioning ML models, and notifying a service management and orchestration (SMO) about malfunctioning models, and the interface terminations comprise an SMO internal interface termination, an A1 interface termination and an external EI interface termination.

5. The apparatus of claim 1, wherein the processing circuitry is further configured to provide an ML training host that is configured to:

train ML models in the ML model catalog, evaluate the ML models, obtain training data and testing data from the database, and retrain and update ML models in response to reception of a request from the ML performance monitor.

6. The apparatus of claim 1, wherein:

the interface terminations comprise an SMO internal interface termination, an A1 interface termination and an external EI interface termination, the processing circuitry is further configured to permit an ML training host to access the ML model catalog for model training and retraining and forward a retraining or model update request from the ML performance monitor to the ML training host via the SMO internal interface termination, and the ML training host is configured to:

train ML models in the ML model catalog, evaluate the ML models, obtain training data and testing data from the database, and retrain and update ML models in response to reception of a request from the ML performance monitor.

7. A non-transitory computer-readable storage medium that stores instructions for execution by one or more processors of a non-real time (RT) Radio Access Network (RAN) intelligent controller (RIC) in Open Radio Access Network (O-RAN), the one or more processors to configure the non-RT RIC to, when the instructions are executed:

use a plurality of rApps configured to provide a plurality of functions;

manage the plurality of rApps, management of the plurality of rApps comprising lifecycle management (LCM) and fault, configuration, accounting, performance, and security (FCAPS) of the plurality of rApps;

perform conflict mitigation and security functions, the conflict mitigation to address conflicting messages generated from different rApps;

monitor machine learning (ML) performance via a ML performance monitor;

provide a ML model catalog that indicates whether a specific ML mode and what type or number of ML models can be executed in a ML inference host;

provide a plurality of interface terminations; and store ML data and Near-RT RIC related information in a database.

8. The medium of claim 7, wherein the instructions, when executed, further configure the non-RT RIC to:

perform ML inference generate artificial intelligence (AI) and ML-based solutions, generate A1-P and A1-EI messages to a Near-RT RIC, generate configuration management (CM) messages to a service management and orchestration (SMO), and interpret an A1 policy feedback message from the Near-RT RIC.

9. The medium of claim 7, wherein the instructions, when executed, further configure the non-RT RIC to perform security functions that are configured to:

prevent an unauthorized ML designer from publishing and installing ML models into an ML model catalog, prevent the unauthorized ML designer from inquiring about an ML capability of an ML inference host, check credentials of external EI sources, prevent malicious external sources from writing unauthorized data into the database, and prevent exposure of data in the database to an unauthorized Near-RT RIC via an A1 interface.

10. The medium of claim 7, wherein:

the instructions, when executed, further configure the non-RT RIC to monitor the ML performance by:

monitoring ML model performance and obtaining ML performance data from the database, sending re-training, ML model update requests to a ML training host, flagging malfunctioning ML models, and notifying a service management and orchestration (SMO) about malfunctioning models, and the interface terminations comprise an SMO internal interface termination, an A1 interface termination and an external EI interface termination.

11. The medium of claim 7, wherein the instructions, when executed, further configure the non-RT RIC to provide an ML training host that is configured to:

train ML models in the ML model catalog, evaluate the ML models, obtain training data and testing data from the database, and retrain and update ML models in response to reception of a request from the ML performance monitor.

12. The medium of claim 7, wherein:

the interface terminations comprise an SMO internal interface termination, an A1 interface termination and an external EI interface termination, the instructions, when executed, further configure the non-RT RIC to permit an ML training host to access the ML model catalog for model training and retraining and forward a retraining or model update request from the ML performance monitor to the ML training host via the SMO internal interface termination, and the ML training host is configured to:

train ML models in the ML model catalog, evaluate the ML models, obtain training data and testing data from the database, and retrain and update ML models in response to reception of a request from the ML performance monitor.

\* \* \* \* \*